July 25, 1933. S. CASANI 1,920,062
LIQUID DEPTH REGULATOR FOR BATHS, TANKS, AND THE LIKE
Filed March 17, 1932 2 Sheets-Sheet 2

Inventor
Santos Casani
by
J. Moo...
atty.

Patented July 25, 1933

1,920,062

UNITED STATES PATENT OFFICE

SANTOS CASANI, OF LONDON, ENGLAND

LIQUID DEPTH REGULATOR FOR BATHS, TANKS, AND THE LIKE

Application filed March 17, 1932, Serial No. 599,422, and in Great Britain March 7, 1931.

This invention relates to water or other liquid depth regulators for receptacles such as tanks or baths, and has for its object to provide means whereby the ordinary overflow may be dispensed with, and whereby the supply of an exact quantity of liquid can be ensured.

The present invention comprises a liquid depth regulator for tanks, baths or other receptacles provided with a float for cutting off the supply when the liquid level reaches a given height, characterized in that the supply is introduced into the receptacle through the upper portion of a vertical tubular member open at its lower end and extending downwards into the liquid supplied to the receptacle, the float being arranged to operate freely in the tubular member to close a supply valve arranged at the upper portion of the tubular member, when the water rises to the desired height in the receptacle.

Figure 1:
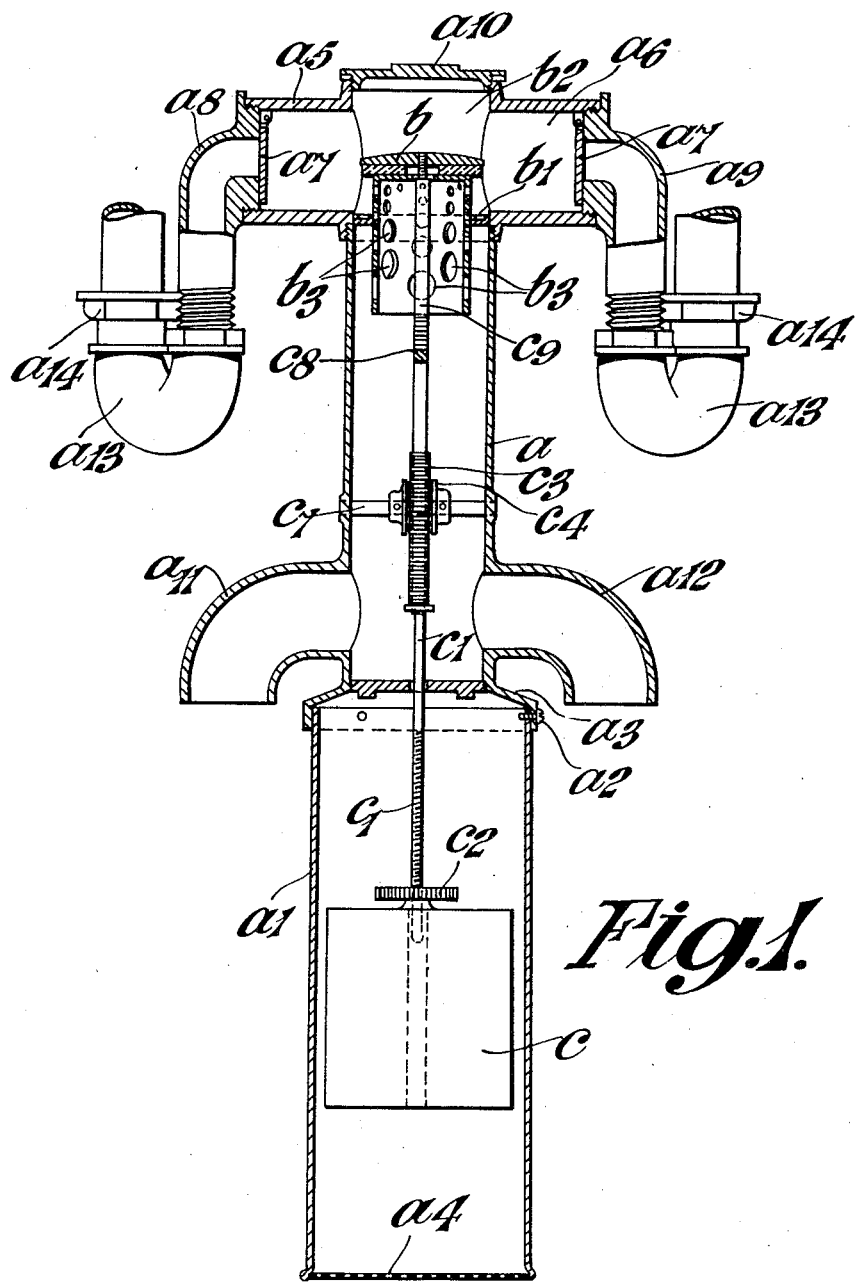
Figure 2:
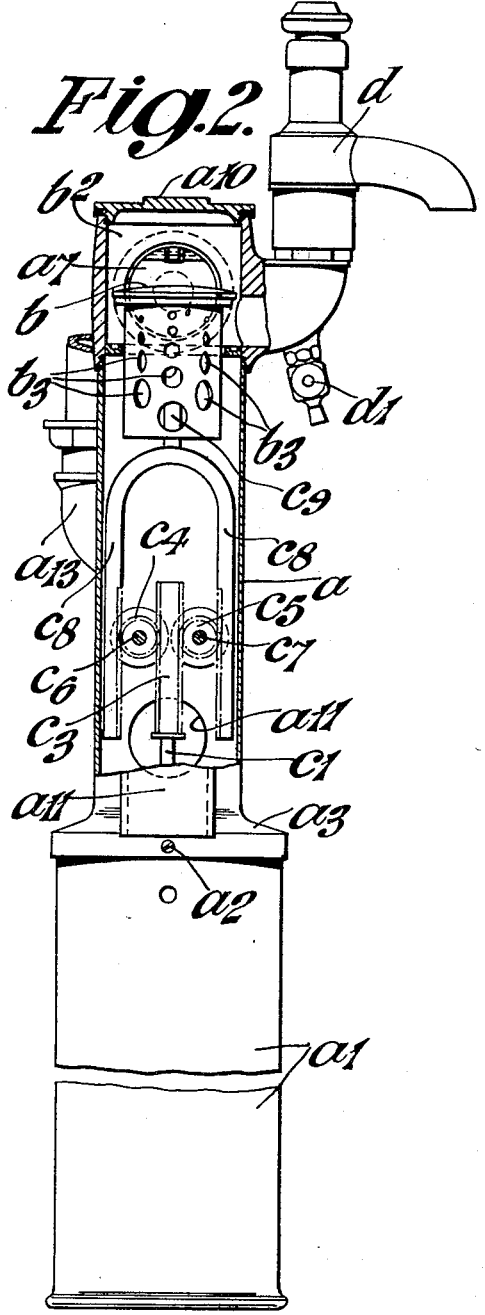

The invention will be described in connection with the accompanying drawings in which Fig. 1 is a sectional front elevation of a liquid depth regulator embodying the invention and Fig. 2 is a partial sectional side view thereof.

In these drawings $a$ is the vertical tubular member or outlet chamber, $b$ the valve at the upper portion thereof, $c$ the float. The float $c$ operates in an enlarged portion $a1$ of the vertical tubular member $a$, such enlarged portion being connected by screws $a2$ to an enlarged socket $a3$ formed on the lower portion of $a$.

The float $c$ is connected to a spindle $c1$ threaded at its lower end to fit a correspondingly tapped hole provided in the float $c$ and provided with an adjusting nut $c2$ whereby the height of the float can be adjusted.

On the spinde $c1$ is provided a double sided rack $c3$ adapted to engage the teeth of two pinions $c4$ and $c5$ rotatably mounted on horizontal shafts $c6$ and $c7$ fixed parallel to each other across the tubular member $a$. The opposite sides of the pinions engage rack teeth formed on the inner sides of a forked member $c8$. The upper portion of the forked member $c8$ extends upwards as a central rod or spindle $c9$ fixed at its upper end to the valve $b$. By means of this mechanism when the float rises it pulls the valve $b$ on to its seat. In this device the pressure of the supply also assists the rising float $c$ in ensuring a perfect closure of the supply valve $b$, as by means of the rack and pinion mechanism the upward movement of the float causes the downward closing movement of the valve in the direction of the supply.

The valve $b$ engages a face $b1$ formed at the upper end of the tubular member $a$ and in the base of an inlet chamber $b2$ which extends into two oppositely disposed lateral extensions $a5$ and $a6$ formed at the top of the tubular member $a$ for hot and cold water supplies respectively. The chamber $b2$ forms a mixing chamber whereby any desired temperature of water in the bath or receptacle can be obtained by varying the ratio of the supplies to the said mixing chamber $b2$. The ratio may be controlled automatically by thermostatic apparatus under the influence of the temperature of the water in the bath or tank.

At the other ends of the extensions $a5$ and $a6$ are provided self closing or non-return valves $a7$ so that should either the hot or cold supply be of a higher pressure than the other it will not force back or interfere with the supply of the other. The valves $a7$ are normally closed by gravity.

The ends of the extensions $a5$ and $a6$ are provided with fittings $a8$ and $a9$ adapted to be connected to the hot and cold supply pipes of a bath or other receptacle. In order that the device may be used on hot and cold water bath taps or the like, of different distances apart, the connecting fittings $a8$ and $a9$ are arranged to turn about vertical axes and are provided with return bends $a13$ having swivel joints $a14$ whereby they can be connected to the taps.

On the top of the chamber $b2$ is provided a removable cover $a10$, adapted to give access to the valve $b$ and its connections, and on the tubular member $a$ are provided two oppositely disposed delivery outlet pipes $a11$ and $a12$ so that the free flow of liquid through the device will not be affected by the float. The outlet pipes $a11$ and $a12$ have nozzles arranged above the surface of the predetermined depth of liquid required.

At the lower end of the tubular member $a$ is provided a gauze covering $a4$ to prevent access of foreign matter into the tubular member, while allowing the level of the water in the tubular member $a$ acting on the float, to be the same as that in the bath or tank.

Under the valve $b$, is provided a cylindrical member or body portion fixed to the valve and loosely fitting in the valve opening $b1$, and provided with graduated perforations $b3$ whereby the passage of the water under the valve $b$ and into the tubular member $a$ is graduated and sudden movements of the valve and the consequent noise thereof prevented.

The mixing chamber $b2$ for hot and cold water is provided with a tap $d$ whereby a supply of hot or cold water or both can be obtained independently of the delivery pipes $a11$ and $a12$.

The chamber $b2$ is also provided, below the valve $d$ with a small relief valve $d1$. The relief valve $d1$ operates as a safety device preventing waste of water as it may be opened when valves (not shown) in the taps connected to swivel joints $a14$ are closed to empty or free the filled mixing chamber $b2$, and this valve $d1$ must be closed before the bath is refilled, and it can also be used from time to time in testing the proper working of the device.

The device may be incorporated in the manufacture of the bath or tank, and may be arranged in a separate chamber attached to the outside of the bath or tank suitable connections being provided, or it may be made as a fitting for use in the bath or tank, also the float, especially in the former case could be arranged outside the main cylindrical member.

What I claim and desire to secure by Letters Patent is:—

1. A liquid depth regulator for tanks and the like, comprising an inlet chamber and an outlet chamber having a connecting opening, a valve adapted to close said opening, a float controlled by the liquid level beneath said outlet chamber, a double-sided vertically movable rack connected to said float, a plurality of pinions cooperating with said rack, and a vertically movable forked member connected to said valve and having teeth on its inner sides adapted to cooperate with said pinions.

2. A liquid depth regulator for tanks and the like, comprising an inlet chamber and an outlet chamber having a connecting opening, a valve adapted to close said opening, a float controlled by the liquid level beneath said outlet chamber, a vertically movable rack connected to said float, a fixed pinion cooperating with said rack, and a vertically movable member connected to said valve and having teeth adapted to cooperate with said pinion.

SANTOS CASANI.